March 18, 1930. J. G. ENGELHART 1,751,033
HEATING RADIATOR
Filed May 2, 1929   2 Sheets-Sheet 1
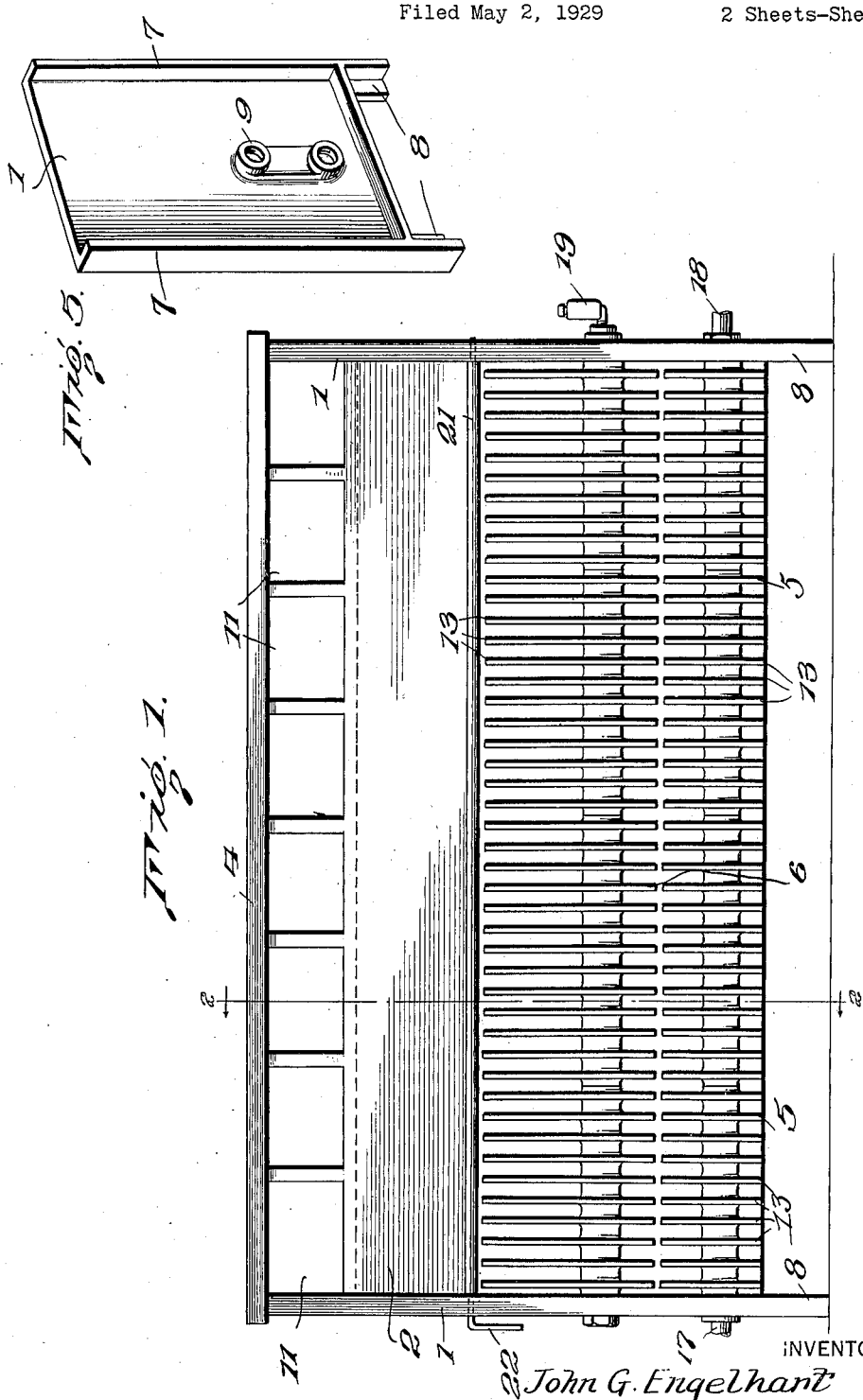
INVENTOR
John G. Engelhart
BY
Linton, Kellogg & Smith
ATTORNEYS March 18, 1930. J. G. ENGELHART 1,751,033
HEATING RADIATOR
Filed May 2, 1929 2 Sheets-Sheet 2
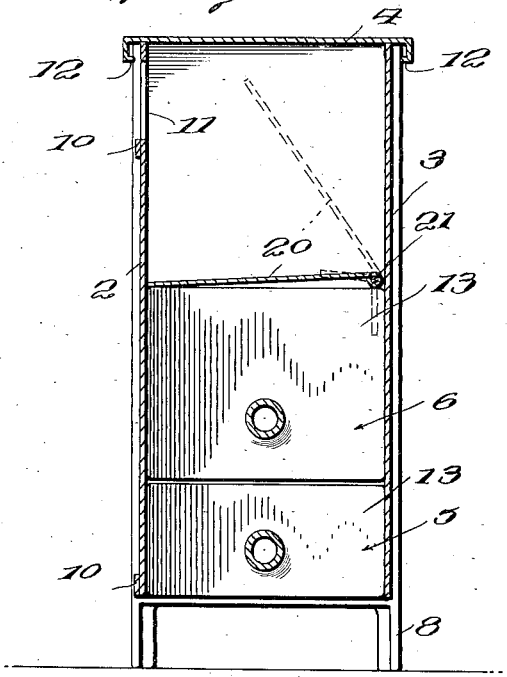
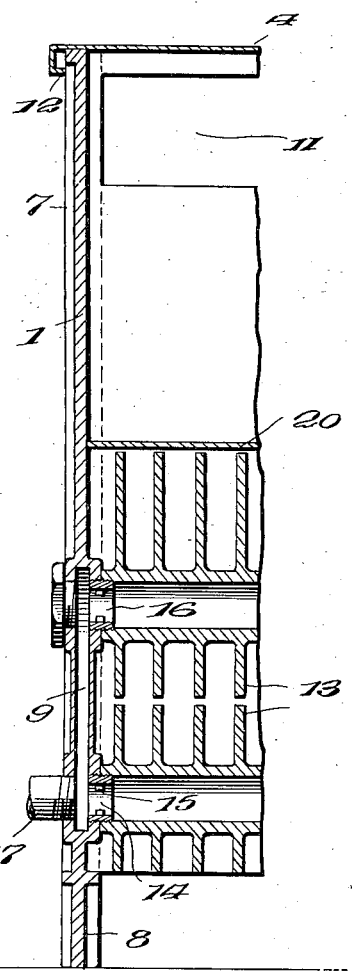
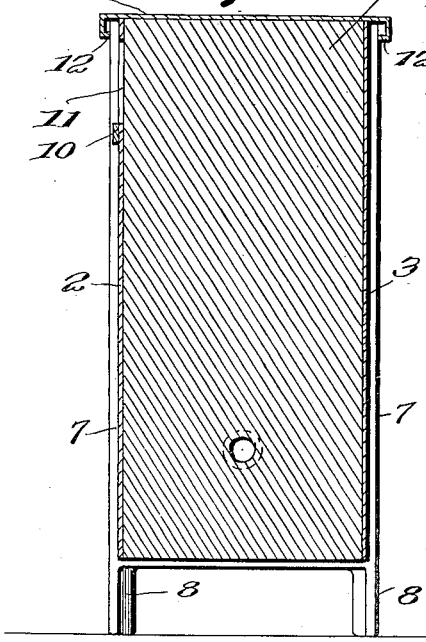
INVENTOR
John G. Engelhart.
BY
Linton, Kellogg & Smith
ATTORNEYS.

Patented Mar. 18, 1930

1,751,033

UNITED STATES PATENT OFFICE

JOHN G. ENGELHART, OF ATLANTA, GEORGIA

HEATING RADIATOR

Application filed May 2, 1929. Serial No. 359,955.

This invention relates to improvements in heating radiators, having for an object to provide a radiator of the encased or housed type, wherein the heat radiating units are received within a casing member and are so arranged as to permit of an efficient exchange of heat and the resultant radiation of heated air therefrom.

It is also an object of the invention to provide a radiator of the character mentioned, employing a novel and advantageous arrangement of heating units and casing assembly, the heating units being effectually housed within the casing and connected to the supporting portions of the same in a manner to permit of the inletting and outletting of the heating medium with the least possible number of working parts, thus materially reducing production and installation costs and also, ensuring practical operation.

Yet another object of the invention is to provide a heating radiator that is so constructed as to permit of the usage of any number and different arrangements of heating units within the casing therefor, whereby to effect the necessary amount of radiation for a particular area to be heated thereby.

A still further and equally important object of the invention may be stated to reside in the provision of a casing for the heating units of the construction, having means for permitting of an effectual outletting or radiation of heated air therefrom and also, the regulation of the discharge of such heated air according to the present requirements or desires of a user.

A still further object of the invention is to provide the casing of the radiator construction with end walls, so formed or designed, that they will serve as means for supporting the device and also, as means for effecting communication between the heating units connected thereto, in order that the heating medium employed may be caused to circulate therethrough.

Other objects of the invention will be in part obvious and in part pointed out hereinafter.

In order that the invention and its mode of operation may be readily understood by persons skilled in the art, I have in the accompanying illustrative drawings, and in the detailed following description based thereon, set out several possible embodiments of the same.

In these drawings:

Figure 1 is a rear elevation of the improved radiator construction with the rear side wall thereof removed to show the relative positioning or arrangement of the heating units within the casing construction;

Figure 2 is a vertical transverse section taken on the line 2—2 of Figure 1 looking in the direction in which the arrows point;

Figure 3 is an enlarged fragmentary detail in vertical longitudinal section showing the manner in which a supporting and intercommunicating connection is effected as between the heating units and the end walls of the radiator casing construction;

Figure 4 is a vertical transverse section through a modified form of the invention wherein the radiating fins of the heating unit extend completely to the top of the radiator casing construction, and Figure 5 is a detail in perspective of one of the end walls of the radiator casing illustrating the formation of the inwardly extending longitudinal and transverse flanges upon the inner side or face thereof.

Having more particular reference to the drawings, in connection with which like characters of reference will designate corresponding parts throughout, the improved radiator construction in the embodiment chosen for illustration herein, may be stated to comprise end walls indicated by the numeral 1, side walls indicated by the numerals 2 and 3 and a cover or top wall 4, the specific construction of which will be hereinafter more fully described. Through the arrangement of the various walls referred to, there is provided a substantially box-like casing or housing in which the radiating units of the radiating device are adapted to be arranged and supported in assembled form, these radiating units being indicated in their entireties at this particular time, through the medium of the numerals 5 and 6.

The end walls 1 of the radiator construction are preferably formed of material sufficiently heavy and strong to bear or support the weight of the entire construction, generally outlined, as above. They each comprise substantially rectangularly shaped bodies formed with marginally arranged strengthening webs or flanges 7, the side flanges and the lowermost flange of each being extended inwardly, as is well shown in the Figure 5, while upon the lower portions of the several end walls, supporting legs 8 are provided and as will be understood these legs are of corresponding lengths and serve to support the radiator construction at the proper height above the receiving or supporting surface.

The lower and intermediate portions of the several end walls 1 are thickened and formed with longitudinally disposed ways or by-passes 9, communicating at their opposite extremities with openings opening onto the opposite sides of the walls and being internally screw threaded, for a purpose that will be presently described.

The forward side wall 2 of the radiator casing is formed of a length of sheet metal, reinforced throughout such length, through the medium of stiffening ribs, or similar devices 10 and whereas the lower portion of this front wall is plane or solid, the upper portion thereof is formed with a series of heated air outlet ways generally indicated by the numeral 11. This front side wall 2 is adapted to be snugly and slidably arranged between the relatively opposed end walls 1, the lower portion of the same resting, adjacent its opposite extremities, upon the inwardly extending portions of the lower transverse flanges of the end walls 1 and thus finding effectual support thereon, whereas the opposite end portions of said front side wall are secured against outward or lateral displacement by bearing upon the adjacent portions of the inwardly extended parts of those adjacent flanges formed upon the sides of the end walls.

The rear side wall 3 of the radiator casing is formed of a body of sheet metal or other suitable material, substantially rectangular in shape and of a size to permit of its snug slidable reception between the relatively opposed end walls 1 adjacent the opposite side portions of the same; the opposite extremities of the lower side of said wall 3 resting upon the adjacent portions of the inwardly extending transverse flanges formed upon said end walls, while the opposite extremities of the several side portions of said end wall 3 have contact with the adjacent marginal side flange of the end walls 1 and thus, are prevented from being outwardly displaced with respect thereto.

In this connection, it is to be noted that the depth of the several side walls 2 and 3 is such that with their arrangement in assembled relation with respect to the end walls 1, the upper marginal portions thereof lie substantially flush with the corresponding marginal portions of said end walls 1.

The top or cover wall 4 of the casing preferably consists of a body of sheet metal or other suitable material formed with downwardly disposed flanges, certain of which, i. e., the two end flanges and one of the side flanges, are of depths greater than the remaining side flange and are each formed with inwardly disposed lips 12. Thus, with arrangement of the top or cover wall 4 over the upper marginal portions of the walls 1 and 2, the inturned lips 12 upon the end flanges are adapted to engage under the adjacent flanges 7 formed upon the upper extremities of the end wall 1 and consequently upon this, will serve as means for effectually securing said top wall or cover 4 thereto and against undue or accidental displacement. The flange upon the side wall or marginal portion of the cover 4 formed with the inturned lip 12, provides the cover with a complete finish.

The heating units 5 and 6 are preferably constructed in sections, said sections each carrying a certain number of radiating fins or bodies generally indicated by the numeral 13.

Referring in particular to the heating unit designated by the numeral 5, it will be noted that the size of the radiating fins 13 thereof is less than the size of the radiating fins 13 upon the upper unit 6. This difference in sizing of the radiating fins 13, however, is not necessary to effect a practical functioning of the same, but is done more for the purpose of increasing the heat radiating area within the radiator casing construction. If desired, these radiating fins 13 may be of corresponding size or, on the other hand, the arrangement of the fins may be reversed, that is, in some instances, if required, the smaller radiating fins could be positioned above the larger radiating fins. Those sections constituting the heating unit 5 are secured in coaxial or longitudinal relation by arranging suitable connecting devices (not shown herein) between the meeting or abutting ends of said sections and, when a heating unit 5 of the proper length has been secured by this assembly of sections, the same is arranged within the radiator casing construction heretofore described. With this positioning of the heating unit 5 longitudinally of the radiator casing construction, it will be seen that the opposed ends of the same will be arranged adjacent to the inner side walls of the end walls 1, whereupon said opposite ends of the heating unit are alined with the adjacent lower openings of the by-passes or ways 9, hence, permitting of a supporting connection between the same and said end walls 1 through the medium of screw-threaded connecting sleeves 14 which are turned into engagement with the screw-threaded portions of said openings in the ways 9 and into engagement with the adjacent internally screw-threaded portions of the opposite ends of the heating unit 5; wrench engaging lugs or similar devices 15 being arranged internally of these sleeves 15 for an obvious purpose. Thus, the heating unit 5 will be assembled with respect to the radiator construction and also, it will be understood that in addition to being effectually supported upon the opposite end walls 1 thereof, means of communication will be established as between said heating unit and the channels 9 in the end walls 1.

The heating unit 6 is too, composed of a series of longitudinally alined and interconnected sections, just as is the heating unit 5; the length of said unit 6 being such as to permit of its snug arrangement longitudinally of the radiator casing construction, whereupon the opposite ends of said unit are alined with the upper openings of the ways 9. At this time, screw-threaded connecting sleeves 16, corresponding to the sleeves 14, are engaged with the adjacent screw threaded portions of said openings and of the heating unit 6, hence, effecting a supporting and intercommunicating connection as between the unit and the passageways or by-passes 9 of the end walls 1.

To supply the necessary heating medium to the heating units 5 and 6, I preferably connect to the outer and lowermost opening of the way 9 of one end wall 1, a supply pipe 17, while an outlet pipe 18 is effectually connected to the outermost and lower opening of the opposite end wall 1, as is clearly shown in the Figure 1. Also, an air escape valve of ordinary or accepted construction, such as indicated by the numeral 19 is connected to the upper opening of the way 9 formed in that end wall 1 having the outlet pipe 18 connected thereto. Thus, it will be seen that with the supply of a heating medium through the intake or inlet pipe 17, such medium will be permitted to flow into the way 9 of the adjacent end wall 1 and through and from said way into the superposed heating units 5 and 6. This heating medium will circulate or pass through the heating units 6 and will ultimately discharge from the radiator construction by way of the outlet pipe 18, it being understood herein, that the outletting of the heating medium from the heating unit 6 will be effected from that end of the same directly above the outlet pipe 18, discharging into the passageway or by-pass 9 of the adjacent end wall and flowing downwardly therethrough into said outlet pipe 18.

In order that the air heated by the radiating fins 13 of the heating units 5 and 6 may be effectually discharged from the radiator casing in the desired or required flow, I preferably pivotally mount within the upper portion of the radiator casing, a longitudinally disposed plate valve 20, forming one side of said valve with a bearing pin receiving sleeve 21 through which a bearing pin is arranged; the opposite ends of said pin being journaled in appropriate bearings provided therefor in adjacent portions of the opposite end walls 1 and one end of said bearing pin being extended and formed with a substantially crank-like operating handle 22 for an obvious purpose. At this point, it will be noted that because of the snug arrangement of the plate valve 20 within the radiator construction when said valve is in a horizontal or near horizontal position, the same will function as an effectual damper control means. Thus, when the valve is in that position as is shown in full lines in the Figure 2, the discharge of heated air from the discharge ways 11 of the front wall 2 will be prevented. However, with raising of the valve 20 to that position as is shown in dotted lines in the Figure 2, the heated air circulating by the heating units 5 and 6 will be permitted to travel upwardly and to be discharged forwardly through said ways 11 into the area to be heated by the construction. Obviously, by controlling the positioning of the pivotally mounted plate valve or damper 20 with respect to the discharge ways 11, the flow or amount of heated air from the radiator construction can be controlled to the desired nicety by a user. Of course, the pivotal mounting of the plate valve or damper 20 may be equipped with suitable means for releasably securing the same in any one of its various adjusted positions, such means being common in the art and therefore, not being illustrated herein.

While I have hereinbefore specifically shown my improved radiator construction employing superposed sets of heating units, it is, of course, to be understood that the number of sets of heating units employed may be varied, such as conditions or preference may dictate; also, that the relative arrangement of these heating units within the radiator casing construction, may be changed or varied. Furthermore, in some instances, but a single heating unit may be arranged within the radiator construction and if desired, the radiating fins 13' of the installed heating unit may be of a length to partially or completely fill the internal area of the casing construction; likewise, that with the complete filling of the internal areas of the casing construction, the plate valve or damper 20 may be omitted from the device. It is to be also understood that these heating units 5 and 6, instead of being composed of longitudinally alined and interconnected sections, may be constructed of one piece, the length of which will meet with the requirements of size for the particular radiator construction to be assembled. Similarly, the heating medium receiving and circulating portions of the heating units may vary in size and shape, as may the radiating fins 13 of said units, such as conditions or preference may dictate.

From the foregoing, it will be understood that I have provided a simple yet highly efficient type of heating radiator construction. The length of a radiator constructed or assembled in accordance with the invention, of course, may vary, according to the size of the area heated or to the requirements incidental thereto. However, it will be understood that practically any length of radiator may be made up from the elements or instrumentalities comprehended by my invention and in event that an assembled construction should be longer than that form of the invention illustrated in this particular embodiment, it will be understood that side walls of greater length would be substituted for those side walls hereinbefore referred to by the numerals 2 and 3; it being quite feasible and practical to maintain a stock supply of side walls for usage in connection with the improved radiator construction, of different lengths and hence, permitting of the assembly or construction of radiators in accordance with my invention, of different lengths. Therefore, I desire to have it understood that, within the scope of the appended claims, the invention may be practiced by other forms of construction than that particularly illustrated and described.

I claim:—

1. In a heating radiator, a casing, the end walls of said casing having portions of the same formed with longitudinally disposed passage-ways therein and opening onto the opposite sides thereof, sectional heating units arranged in superposed relation within said casing supported upon said end walls and communicating with said passage-ways, the upper portion of one side wall of said casing having air discharge means formed therein, and means movably mounted within the casing for controlling the discharge of heated air from said heating units through said discharge means.

2. In a heating radiator, end walls having longitudinal and transverse inwardly extending flanges thereon, side walls slidably received between said end walls and bearing upon said flanges, heating units received between said end walls and connected thereto, the connection of said heating units to said end walls maintaining the same and said side walls in assembled relation, the upper portion of one of said side walls having air discharge means formed therein, and means adjustably received between said end and side walls and between said heating units and air discharge means for controlling the discharge of heated air from the latter.

3. In a heating radiator, end walls having longitudinal and transverse inwardly disposed flanges thereon, longitudinally disposed passage-ways formed in said end walls for portions of their lengths and opening onto the opposite sides of the same, side walls received between said end walls and having bearing upon said flanges, heating units received between said end walls supported thereupon and communicating with said passage-ways formed in the same, the upper portion of one of said side walls having air discharge means formed therein, and means movably mounted within said end and side walls interposed between said heating units and said air discharge means for controlling the discharge of heated air from said air discharge means.

4. In a heating radiator, end walls having longitudinal and transverse flanges thereon and extending inwardly from the same, portions of said end walls having passage-ways formed therein and opening onto their opposite sides, side walls received between said end walls and having bearing upon said flanges, a top engaged over the upper portions of said end and side walls, heating units received between and connected to said end walls and communicating with the passage-ways formed therein, the connection of said heating units with said end walls maintaining said end and side walls in relatively assembled relation, the upper portion of one of said side walls having air discharge means formed therein, and means movably mounted between said end and side walls and between the air discharge means and said heating units for controlling the discharge of heated air from the former.

In witness whereof I have hereunto set my hand.

JOHN G. ENGELHART.